(12) United States Patent
Morris (10) Patent No.: US 6,631,159 B1
(45) Date of Patent: Oct. 7, 2003

(54) TRANSCEIVER WITH DISCONNECT DETECTOR

(75) Inventor: Bernard Lee Morris, Emaus, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/438,070

(22) Filed: Nov. 10, 1999

(51) Int. Cl.[7] .................................................. H04B 1/38
(52) U.S. Cl. ........................................ 375/219; 375/224
(58) Field of Search .................................. 375/224, 219, 375/220

(56) References Cited

U.S. PATENT DOCUMENTS

| | | | | |
|---|---|---|---|---|
| 5,461,661 A | * | 10/1995 | Buttle | 379/3 |
| 6,009,527 A | * | 12/1999 | Traw et al. | 713/200 |
| 6,279,060 B1 | * | 8/2001 | Luke et al. | 710/64 |

* cited by examiner

Primary Examiner—Stephen Chin
Assistant Examiner—David B. Lugo
(74) Attorney, Agent, or Firm—Duane Morris LLP (57) ABSTRACT

A transceiver comprises a transmitter for transmitting a transmitted signal to a second transceiver via a cable; a first receiver for receiving a received signal via the cable from the receiving device; and a second receiver for detecting a disconnect condition of the cable when the transmitter is transmitting the transmitted signal.

12 Claims, 6 Drawing Sheets

TRANSCEIVER WITH DISCONNECT DETECTOR

BACKGROUND OF THE INVENTION

1. Field of the Invention

The present invention relates to transceivers and, in particular, to detecting a cable disconnect to provide a hot connection capability.

2. Description of the Related Art

Transceivers (combination transmitter/receiver devices) are widely utilized for digital and analog communication of electrical signals. Transceivers are often connected to each other by external cables. In some transceiver systems, the cable may be connected and disconnected while the system is running. This is sometimes referred to as a "hot connection." To implement a transceiver system with a hot connection capability, the transmitting transceiver must be able to detect if the cable is disconnected within a relatively short time.

One type of transceiver that is utilized and that can be configured to allow hot connections to be made is a USB transceiver, i.e. a transceiver designed in accordance with the Universal Serial Bus (USB) specification, e.g. USB Specification, rev. 1.1 (Apr. 20, 1998). USB is well-known to those skilled in the art; a technical specification on the bus can be found on the World Wide Web at <http://www.ti.com/sc/docs/msp/usb/spec/spec1.htm>. Additional information on USB may be found at <http://www.intel.com/design/usb/>; <http://www.usb.org>; <http://www.usb.org/developers/index.html>. The two "sides" of a communication using transceivers may sometimes be referred to as the "host" side and the "device" side of the system or communication.

Figure 1:
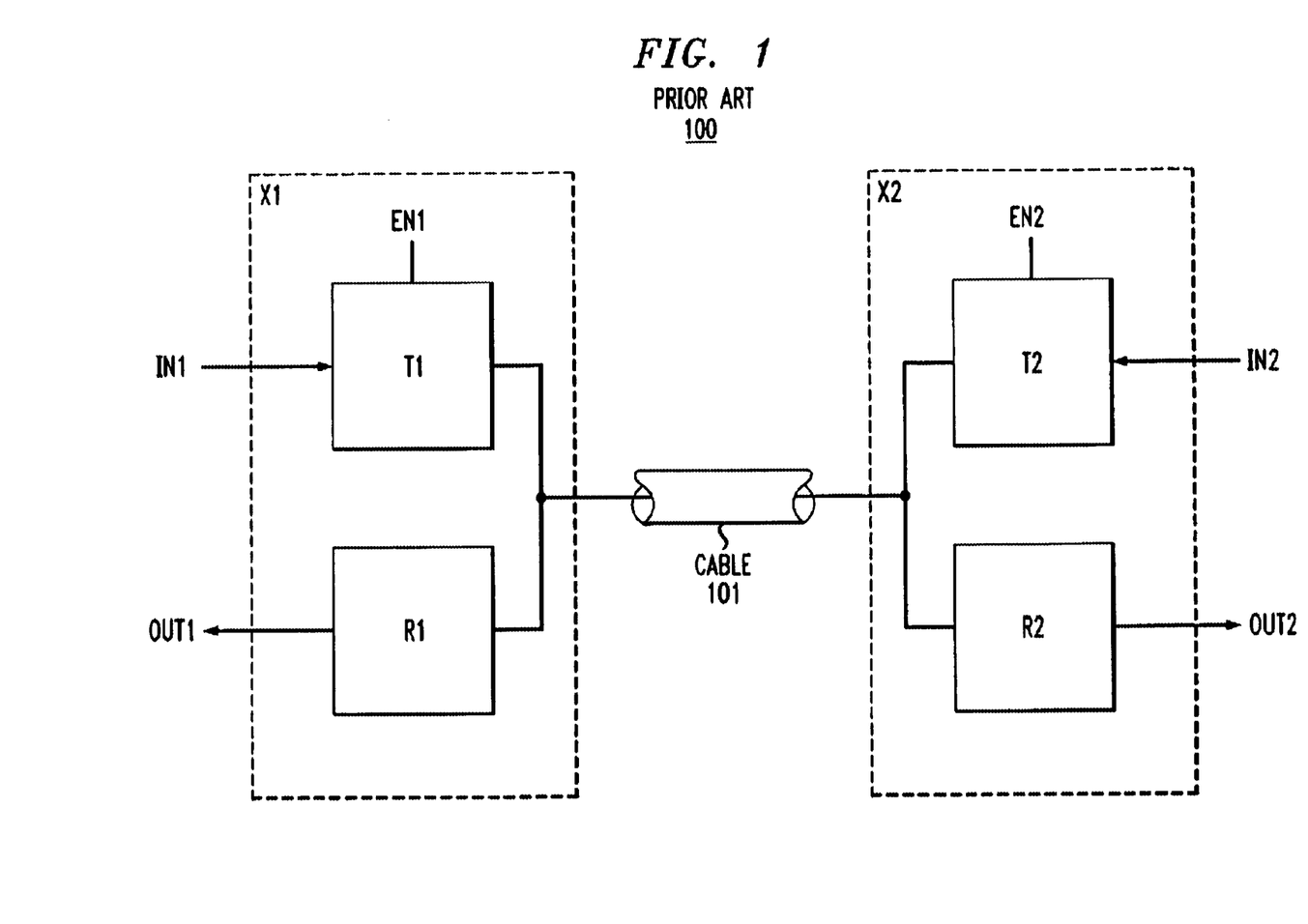
FIG. 1 is a block diagram of a prior art transceiver communication system.

Referring now to FIG. 1, there is shown a high-level block diagram of a prior art communication system 100 having two transceivers $X_1$, $X_2$, connected by a cable 101. Transceiver $X_1$, consists of transmitter $T_1$ and receiver $R_1$. Transmitter $T_1$ may be put into a high impedance state by means of enable signal EN1 when $X_1$ is used in the receive mode. Transceiver $X_2$ is similar to $X_1$ and consists of transmitter $T_2$ and receiver $R_2$. Cable 101, consisting of one or more wires, connects $X_1$ and $X_2$.

Figure 2:
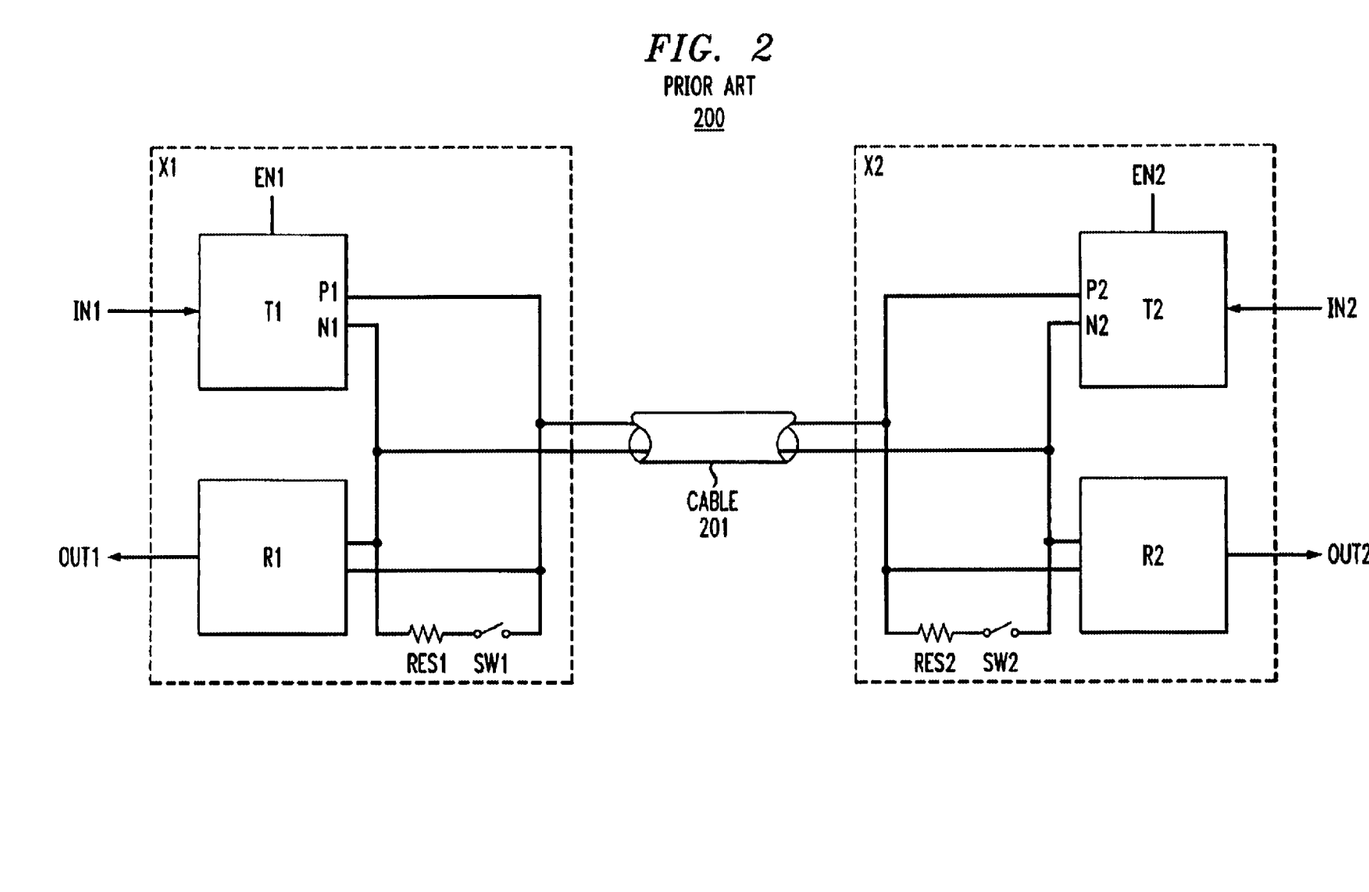
FIG. 2 is a block diagram of a prior art transceiver communication system with differential transceiver connectivity.

Differential transceiver connectivity may also be employed. Referring now to FIG. 2, there is shown a block diagram of a prior art transceiver communication system 200 with differential transceiver connectivity. Differential transceiver system 200 has two special, differential transceivers $X_1$, $X_2$, connected by a cable 201. Transceiver X consists of$_1$ differential transmitter $T_1$ and differential receiver $R_1$. Transceiver $X_2$ is configured similarly.

Figure 3A:
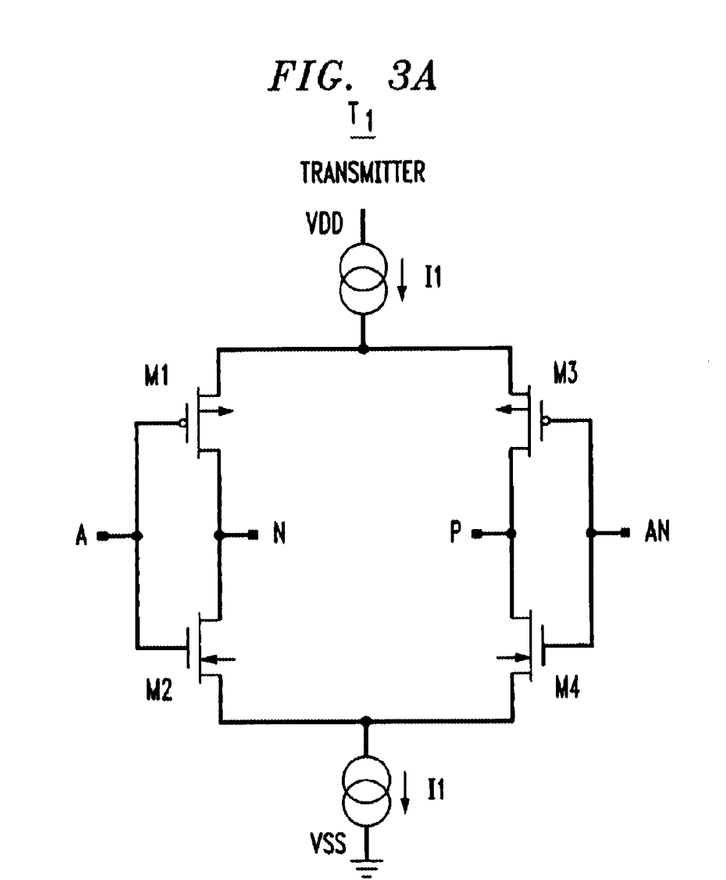
FIGS. 3A,B are circuit diagrams illustrating a transceiver and receiver of the differential transceiver system of FIG. 2 in further detail.
Figure 3B:
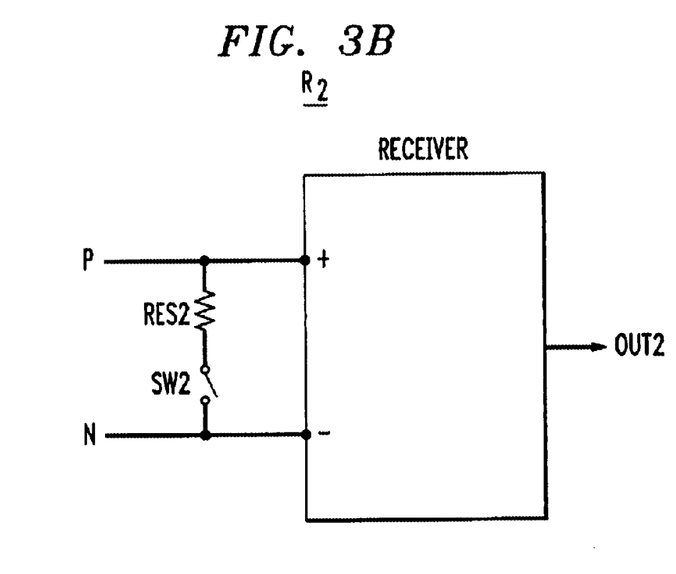

Referring now to FIGS. 3A,B, there are shown circuit diagrams illustrating transceiver $T_1$ and receiver $R_2$ of transceiver system 200 of FIG. 2 in further detail. (Transceiver $T_2$ and receiver $R_1$ of system 200 are configured similarly.) Transmitter $T_1$ steers a current $I_1$ through a termination resistor $RES_2$ of receiver $R_2$, whose value matches the impedance $Z_O$ of the cable connecting these two components (e.g., a cable such as cable 201). Typical values of $Z_O$ vary from 20Ω to 150Ω, depending on the type of cable employed. Receiver $R_2$ is merely a differential comparator. When input A is low and its inverse AN is high, transistors $M_1$ and $M_4$ are on, and transistors $M_2$ and $M_3$ are off. If switch $SW_2$ coupled to resistor $RES_2$ of receiving transceiver $X_2$ is closed, the current $I_1$ is steered from node N, through resistor $RES_2$, back into node P, and then to ground. Thus, node P is at a lower voltage than node N, so the output $OUT_2$ of the receiver $R_2$ is low. When A is high and AN is low, the current $I_1$ is steered in the opposite directions, so that node N is at a lower voltage than node P, so the receiver's output is high.

Referring once more to FIG. 2, the termination resistors $RES_1$, $RES_2$ may be placed at both sides of cable 201, or at only one side. In order to minimize reflections from impedance mismatch, it is preferable to have a termination resistor on the side that is receiving. Placing another termination resistor on the side that is transmitting may help signal integrity further, but it comes at the price of doubling the power that is needed to produce and transmit a given signal.

This may be seen in the following example. Assume a 50Ω cable impedance and a single 50Ω termination resistor, placed at the receiver side. Typical differential signals are 200 mV to 800 mV. If a 400 mV signal is desired, this is achieved by having a current of 8mA flow through the 50Ω termination resistor. With a 3.3V power supply, this means a DC power consumption of 26.4 mW. However, if there is a 50Ω termination resistor at each side of the cable, a 16 mA current is needed to yield the same 400 mV signal. This results in a DC power consumption of 52.8 mW. For this reason, it is often a good idea to have the switch ($SW_1$ or $SW_2$) open at the side that is transmitting and closed at the side that is receiving.

In order to detect cable disconnect, present USB transceivers use two external 15 KΩ pull-down resistors at the host side of the cable, and a 1.5 KΩ pull-up resistor at the device side of the cable. As long as the cable is connected, the host senses that one connection of the (differential) gain signal is high and the other is low. If the cable is disconnected, however, both connections are pulled low by the 15 KΩ pull-down resistors. In this manner, the host side may detect whenever the cable has been disconnected.

This disconnect-detection technique has several disadvantages. First, it only works for the host side of the cable, not the device side. Second, this technique is relatively slow, and may be unacceptably slow for some applications. The RC time constant is typically 4.5 μs, since an approximately 300 pF load must be pulled down through the 15 KΩ pull-down resistor. (Lower value resistors could be used to reduce the time constant and to speed up the detection, but this would utilize more DC power, which is also undesirable.) Third, this technique requires the use and presence of the external pull-down resistors at the host side.

SUMMARY

A transceiver comprises a transmitter for transmitting a transmitted signal to a second transceiver via a cable; a first receiver for receiving a received signal via the cable from the receiving device; and a second receiver for detecting a disconnect condition of the cable when the transmitter is transmitting the transmitted signal.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

The present invention provides for an improved transceiver system and method for detecting transceiver cable disconnect. As described in further detail below, the present invention includes a second, extra receiver at each transceiver attached to the connecting cable. The purpose of each such extra receiver is to detect the disconnect condition of the transceiver from the cable. Unlike previous techniques described above, the technique of the present invention is fast, will work at both sides of the cable, and does not require any external resistors.

Figure 4:
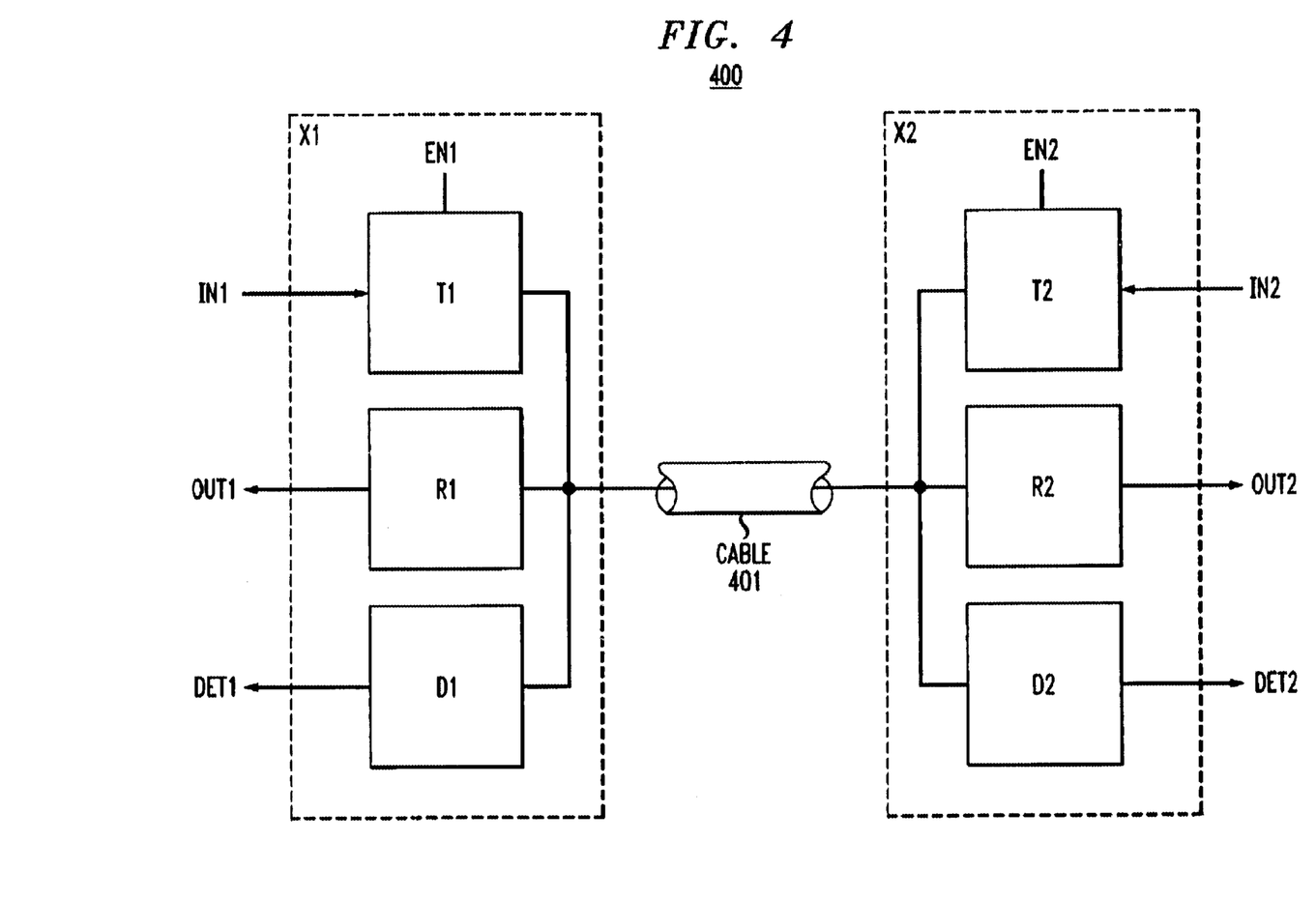
FIG. 4 is a block diagram of a transceiver communication system employing disconnect detectors, in accordance with an embodiment of the present invention.

Referring now to FIG. 4, there is shown a high-level block diagram of a transceiver communication system 400 comprising two transceivers $X_1$, $X_2$, each having a disconnect detector D, in accordance with an embodiment of the present invention. Transceiver $X_1$ consists of transmitter $T_1$, receiver $R_1$, and a second receiver $D_1$, so-labeled because it serves as a disconnect detector. Transceiver $X_2$ consists of transmitter $T_2$, receiver $R_2$, and second receiver $D_2$. Transceivers $X_1$ and $X_2$ are connected by cable 401.

Figure 5:
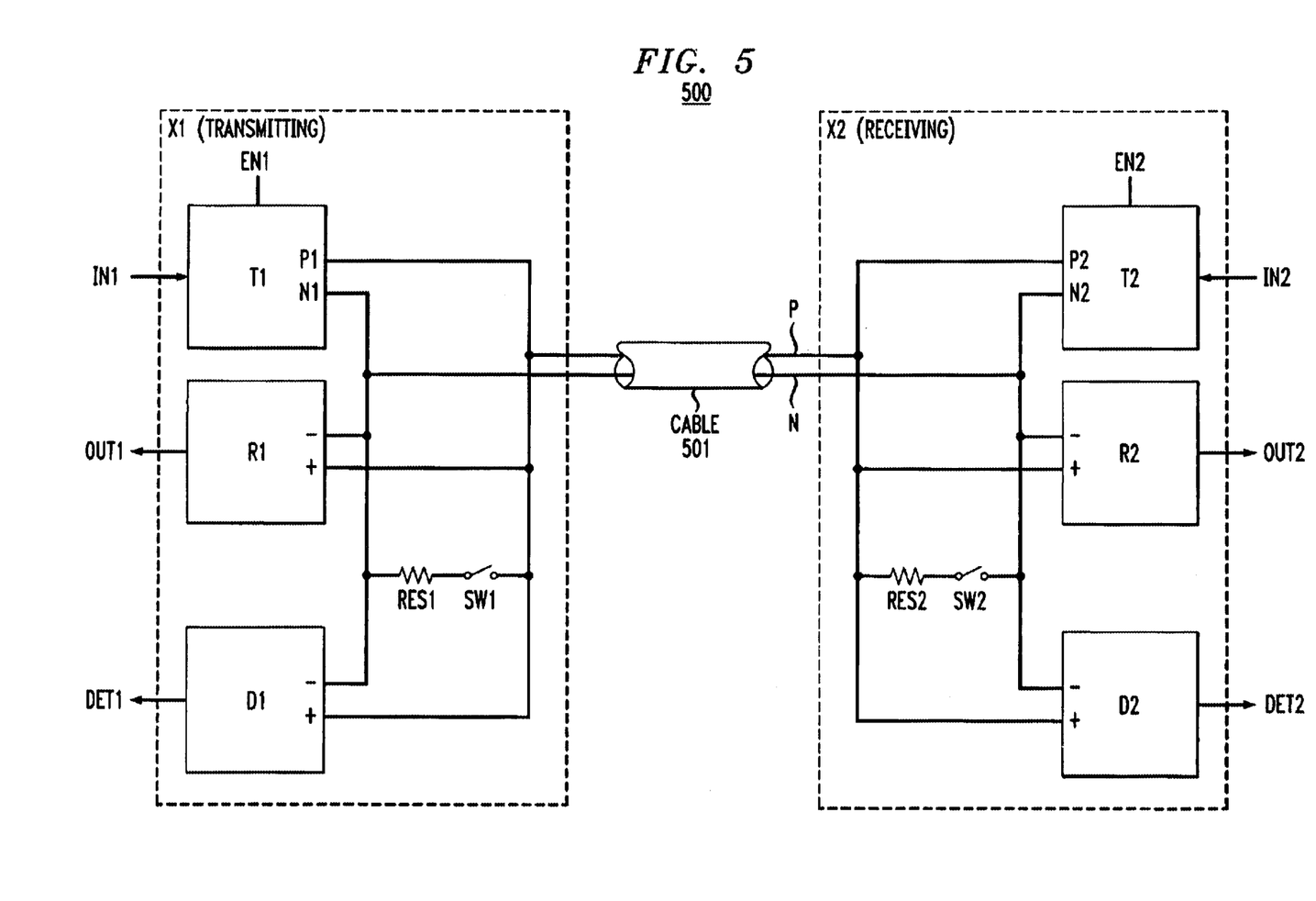
FIG. 5 is a block diagram of a differential transceiver communication system employing disconnect detectors, in accordance with an embodiment of the present invention.

In transceiver $X_1$, the first receiver $R_1$ is used to detect the signal from transmitter $T_2$ of transceiver $X_2$ via cable 401, while second receiver (or disconnect detector) $D_1$ is used to determine if cable 401 is connected between $X_1$ and $X_2$. When cable 401 does not provide a connection between the transmitter of the transmitting transceiver (e.g., $X_1$) and the receiver of the receiving transceiver (e.g. $X_2$), there may be said to be a disconnect condition with respect to cable 401. Thus, transceiver $X_1$ comprises a transmitter ($T_1$) for transmitting a transmitted signal to a second transceiver ($X_2$) via a cable (401); a first receiver ($R_1$) for receiving a received signal via the cable from the second transceiver ($X_2$); and a second receiver (disconnect detector, $D_1$) for detecting a disconnect condition of the cable when the transmitter ($T_1$) is transmitting the transmitted signal. For a receiving transceiver, such as transceiver $X_2$ in this example, it is obvious that the cable is disconnected because no data is coming through. In one embodiment, transceiver system 400 may employ differential transceiver connectivity, as illustrated with reference to FIGS. 5 and 6. Referring now to FIG. 5, there is shown a block diagram of a differential transceiver communication system 500 employing disconnect detectors, in accordance with an embodiment of the present invention. Transceiver system 500 employs two differential transceivers $X_1$, $X_2$, each having a differential transmitter ($T_1$, $T_2$, respectively), a first differential receiver ($R_1$, $R_2$, respectively), and a second differential receiver ($D_1$, $D_2$, respectively), which serves as a disconnect detector for that transceiver.

In the embodiment illustrated in FIG. 5, transceiver $X_1$ is transmitting and $X_2$ is receiving. To achieve a transmitted differential signal within a desired signal range, a current provided by the transmitter is transmitted through the cable and through the receiving transceiver's termination resistor. To reduce the current and power needed, the termination resistor of the transmitting transceiver is deactivated (i.e., de-coupled from the differential signal nodes), e.g. with a switch. i.e., the termination resistor switch of the transmitting side is open and of the receiving side is closed. Thus, when a transceiver is transmitting a transmitted signal, the switch of that transceiver is open to deactivate its termination resistor, while the switch of the receiving transceiver is closed to activate its termination resistor.

In particular, the termination resistor $RES_2$ of $X_2$ is activated by switch SW being closed, while $RES_1$ is inactive because switch $SW_1$ is open. The result of this is a differential signal having a normal range of approximately 400 mV between node P and node N. If cable 501 becomes disconnected, transmitter $T_1$ (which is identical in configuration to the differential transmitter $T_1$ illustrated in FIG. 3A) will no longer "see" the termination resistor $RES_2$. In this case, the range of the signal between nodes P and N will become much larger, typically twice as large, depending on the exact characteristics of the current sources used in $T_1$. In order to detect this disconnect condition, disconnect detector or receiver $D_1$ is designed as a differential comparator with a large offset, so that its output only goes high when the input is appreciably higher than the normal differential signal range (e.g., only when the input is >>400 mV, i.e. exceeds 400 mV by a predetermined threshold amount).

Thus, in an embodiment, the differential transmitter (e.g. $T_1$) of the transmitting transceiver (e.g. $X_1$) transmits a differential transmitted signal to the second transceiver via the cable, where the differential transmitted signal has a normal signal range when the cable connects the two transceivers, and a (substantially) higher signal range when the cable is disconnected, because the second (receiving) transceiver comprises a termination resistor which the transmitting transceiver's transmitter cannot "see" when there is a cable disconnect condition. The second receiver ($D_1$) or disconnect detector of the transmitting transceiver ($X_1$) is a differential comparator that detects a cable disconnect condition by detecting whether the range of the differential transmitted signal exceeds the normal signal range by a predetermined threshold.

Figure 6:
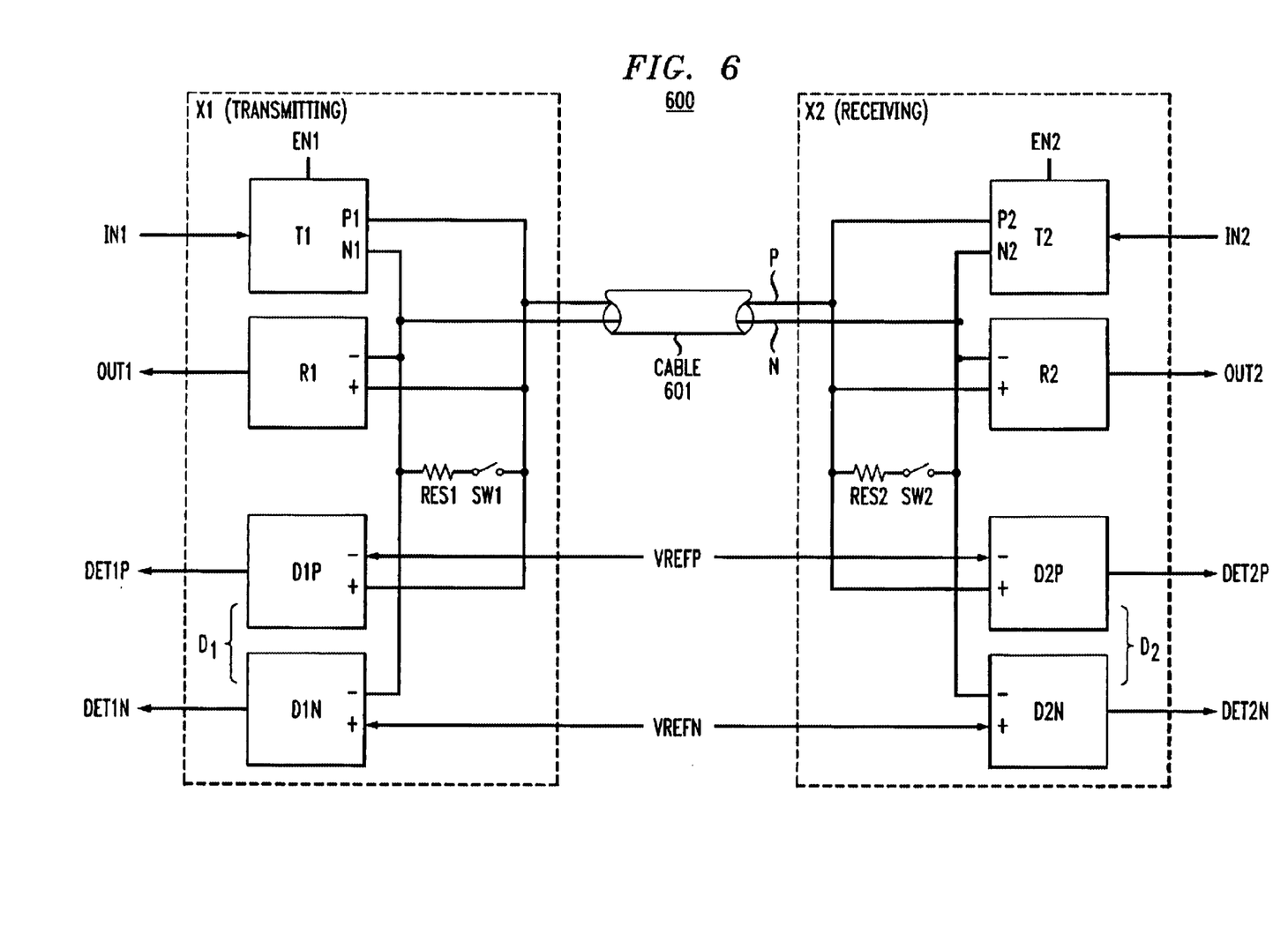
FIG. 6 is a block diagram of a differential transceiver communication system employing disconnect detectors, in accordance with another embodiment of the present invention.

Referring now to FIG. 6, there is shown a block diagram of a differential transceiver communication system 600 employing disconnect detectors, in accordance with another embodiment of the present invention. In system 600, each disconnect receiver $D_1$, $D_2$ of the system 500 of FIG. 5 is implemented, instead, with a pair of disconnect receivers ($D_{1P}$, $D_{1N}$; $D_{2P}$, $D_{2N}$, respectively). Each of these is a differential comparator, designed in the normal way without any offset. Each one has a reference voltage associated therewith ($V_{REFP}$ or $V_{REFN}$, respectively).

As noted above, under normal conditions a differential signal is produced between nodes P and N having a normal range of approximately 400 mV; a higher signal range exists when cable 601 becomes disconnected. Thus, under normal (i.e., non-disconnect) conditions, the voltage at node P does not exceed a certain threshold magnitude, and the voltage at node N does not fall below a certain threshold magnitude. When there is a disconnect condition, at least one of the voltages at nodes P and N exceeds its respective threshold magnitude (in absolute value terms).

Thus, reference voltages $V_{REFP}$ and $V_{REFN}$ are selected so that, under normal conditions (i.e., when cable 601 is connected), the voltage on node P never goes above that of reference voltage $V_{REFP}$, and the voltage on node N never drops below that of reference voltage $V_{REFN}$ Therefore, the outputs of both $D_{1P}$ and $D_{1N}$, i.e. $DET_{1P}$ and $DET_{1N}$, respectively, remain low so long as cable 601 is connected. If cable 601 is disconnected, the absence of terminating resistor $RES_2$ (from the perspective of transceiver $X_1$) results in a much larger maximum voltage on node P and/or a smaller minimum voltage on node N, causing the outputs $DET_{1P}$ and $DET_{1N}$ of both or either of $D_{1P}$ and $D_{1N}$, respectively, to go high.

Thus, in an embodiment, the differential transmitter (e.g. $T_1$) of the transmitting transceiver (e.g. $X_1$) transmits a differential transmitted signal to the second transceiver via the cable, where the differential transmitted signal has a normal positive signal range on a positive differential signal node and a normal negative signal range on a negative differential signal node when the cable connects the two transceivers; when the cable is disconnected, the differential signal has either a higher positive signal range or lower negative signal range, or both. Thus, the second receiver $D_1$ comprises positive and negative differential comparators, each coupled, respectively, to positive and negative reference voltages, wherein the positive and negative differential comparators detect the disconnect condition by detecting, respectively, whether the positive signal range of the differential transmitted signal exceeds the positive reference voltage or whether the negative signal range of the differential transmitted signal is below the negative reference voltage. The reference voltages are preferably selected so that they will not be exceeded by the respective signals in the respective comparators unless there is a cable disconnect.

Some or all of the components of the transceivers of transceiver systems 400, 500, 600, of the present invention may be fabricated as an integrated circuit (IC), within a semiconductor chip. Chips are formed in the substrate of a physical wafer, e.g. a silicon wafer. Typically, several chips are formed in each wafer. A wafer is a very thin, flat disc of a given diameter. The manufacturing process consists of operations on the surface and substrate of the wafer to create a number of chips. Once the wafer is completely processed, it is cut up into the individual chips, the size of which depends on the number of components and complexity of each chip.

The present invention, therefore, allows a high-speed detection of cable disconnect at the transmitting end, without the need for any external resistors. The present invention therefore easily allows a cable disconnect condition to be detected by transceivers at either end of the cable.

The term cable is used herein to refer to any transmission medium sufficient to carry signals between transceivers, such as one or more conducting wires.

In an alternative embodiment, the transmitting transceiver transmits a transmitted signal to any receiving device, i.e. device having a receiver. Thus, the first or transmitting transceiver comprises a transmitter, receiver, and second receiver that functions as a disconnect detector. The transceiver may employ differential transceiver connectivity and the receiving device has a switched termination resistor, as in FIGS. 5 and 6.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A transceiver, comprising:

(a) a transmitter for transmitting a transmitted signal to a second transceiver via a cable; and (b) a receiver for detecting a disconnect condition of the cable when the transmitter is transmitting the transmitted signal, wherein:

the transceiver is a differential transceiver for transmitting a differential transmitted signal to the second transceiver via the cable, the differential transmitted signal having a normal signal range when the cable is not disconnected and having a higher signal range when the cable is disconnected;

the second transceiver comprises a termination resistor;

the transmitter is a differential transmitter comprising a current source for transmitting a current through the termination resistor of the second transceiver via the cable when the cable is not disconnected; and the receiver is a differential comparator for detecting the disconnect condition by detecting whether the range of the differential transmitted signal exceeds the normal signal range by a predetermined threshold.

2. The transceiver of claim 1, wherein the value of the termination resistor matches the impedance of the cable.

3. The transceiver of claim 1, further comprising a termination resistor coupled in series with a switch, wherein:

the termination resistor of the second transceiver is coupled to a switch;

when the transceiver is transmitting the transmitted signal, the switch of the transceiver is open to deactivate the termination resistor of the transceiver and the switch of the second transceiver is closed to activate the termination resistor of the second transceiver; and when the transceiver is receiving the received signal from the second transceiver, the switch of the transceiver is closed to activate the termination resistor of the transceiver and the switch of the second transceiver is open to deactivate the termination resistor of the second transceiver, whereby only one termination resistor is coupled to the cable at a time.

4. A transceiver, comprising:

(a) a transmitter for transmitting a transmitted signal to a second transceiver via a cable; and (b) a receiver for detecting a disconnect condition of the cable when the transmitter is transmitting the transmitted signal, wherein:

the transceiver is a differential transceiver for transmitting a differential transmitted signal to the second transceiver via the cable, the differential transmitted signal having a normal positive signal range on a positive node and having a normal negative signal range on a negative node when the cable is not disconnected and having a higher signal range when the cable is disconnected;

the second transceiver comprises a termination resistor;

the transmitter is a differential transmitter comprising a current source for transmitting a current through the termination resistor of the second transceiver via the cable; and the receiver comprises positive and negative differential comparators, each coupled, respectively, to positive and negative reference voltages, wherein the positive and negative differential comparators are for detecting the disconnect condition by detecting, respectively, whether the positive signal range of the differential transmitted signal exceeds the positive reference voltage or the negative signal range of the differential transmitted signal is below the negative reference voltage.

5. An integrated circuit having a transceiver, the transceiver comprising:
   (a) a transmitter for transmitting a transmitted signal to a second transceiver via a cable; and
   (b) a receiver for detecting a disconnect condition of the cable when the transmitter is transmitting the transmitted signal, wherein:
      the transceiver is a differential transceiver for transmitting a differential transmitted signal to the second transceiver via the cable, the differential transmitted signal having a normal signal range when the cable is not disconnected and having a higher signal range when the cable is disconnected;
      the second transceiver comprises a termination resistor;
      the transmitter is a differential transmitter comprising a current source for transmitting a current through the termination resistor of the second transceiver via the cable when the cable is not disconnected; and
      the receiver is a differential comparator for detecting the disconnect condition by detecting whether the range of the differential transmitted signal exceeds the normal signal range by a predetermined threshold.

6. The integrated circuit of claim 5, wherein the value of the termination resistor matches the impedance of the cable.

7. The integrated circuit of claim 5, further comprising a termination resistor coupled in series with a switch, wherein:
   the termination resistor of the second transceiver is coupled to a switch;
   when the transceiver is transmitting the transmitted signal, the switch of the transceiver is open to deactivate the termination resistor of the transceiver and the switch of the second transceiver is closed to activate the termination resistor of the second transceiver; and
   when the transceiver is receiving the received signal from the second transceiver, the switch of the transceiver is closed to activate the termination resistor of the transceiver and the switch of the second transceiver is open to deactivate the termination resistor of the second transceiver, whereby only one termination resistor is coupled to the cable at a time.

8. An integrated circuit having a transceiver, the transceiver comprising:
   (a) a transmitter for transmitting a transmitted signal to a second transceiver via a cable; and
   (b) a receiver for detecting a disconnect condition of the cable when the transmitter is transmitting the transmitted signal, wherein:
      the transceiver is a differential transceiver for transmitting a differential transmitted signal to the second transceiver via the cable, the differential transmitted signal having a normal positive signal range on a positive node and having a normal negative signal range on a negative node when the cable is not disconnected and having a higher signal range when the cable is disconnected;
      the second transceiver comprises a termination resistor;
      the transmitter is a differential transmitter comprising a current source for transmitting a current through the termination resistor of the second transceiver via the cable; and
      the receiver comprises positive and negative differential comparators, each coupled, respectively, to positive and negative reference voltages, wherein the positive and negative differential comparators are for detecting the disconnect condition by detecting, respectively, whether the positive signal range of the differential transmitted signal exceeds the positive reference voltage or the negative signal range of the differential transmitted signal is below the negative reference voltage.

9. A transceiver system, comprising:
   (a) a first transceiver;
   (b) a second transceiver; and
   (c) a cable for connecting the first and second transceivers to each other, wherein each transceiver comprises:
      (1) a transmitter for transmitting a transmitted signal to a first receiver of the other transceiver via the cable; and
      (2) a receiver for detecting a disconnect condition of the cable when the transmitter is transmitting the transmitted signal, and wherein:
         the first and second transceivers are differential transceivers, each comprising a termination resistor;
         the transmitter of each transceiver transmits a differential transmitted signal to the receiver of the other transceiver via the cable, the differential transmitted signal having a normal signal range when the cable is not disconnected and having a higher signal range when the cable is disconnected;
         the transmitter of each transceiver is a differential transmitter comprising a current source for transmitting a current through the termination resistor of the other transceiver via the cable when the cable is not disconnected; and
         the receiver of each transceiver is a differential comparator for detecting the disconnect condition by detecting whether the range of the differential transmitted signal exceeds the normal signal range by a predetermined threshold.

10. The transceiver system of claim 9, wherein the value of each termination resistor matches the impedance of the cable.

11. The transceiver system of claim, wherein:
   each termination resistor is coupled in series with a switch of the respective transceiver;
   when one of the transceivers is transmitting the transmitted signal, the switch of said one transceiver is open to deactivate its termination resistor and the switch of the other transceiver is closed to activate its termination resistor, whereby only one termination resistor is coupled to the cable at a time.

12. A transceiver system, comprising:
   (a) a first transceiver;
   (b) a second transceiver; and
   (c) a cable for connecting the first and second transceivers to each other, wherein each transceiver comprises:
      (1) a transmitter for transmitting a transmitted signal to a first receiver of the other transceiver via the cable; and
      (2) a receiver for detecting a disconnect condition of the cable when the transmitter is transmitting the transmitted signal, and wherein:
         the first and second transceivers are differential transceivers, each comprising a termination resistor;
         the transmitter of each transceiver transmits a differential transmitted signal to the receiver of the other transceiver via the cable, the differential transmitted signal having a normal positive signal range on a positive node and having a normal negative signal range on a negative node when the cable is not disconnected and having a higher signal range when the cable is disconnected;

the transmitter of each transceiver is a differential transmitter comprising a current source for transmitting a current through the termination resistor of the second transceiver via the cable; and the receiver of each transceiver comprises positive and negative differential comparators, each coupled, respectively, to positive and negative reference voltages, wherein the positive and negative differential comparators are for detecting the disconnect condition by detecting, respectively, whether the positive signal range of the differential transmitted signal exceeds the positive reference voltage or the negative signal range of the differential transmitted signal is below the negative reference voltage.

* * * * *

UNITED STATES PATENT AND TRADEMARK OFFICE
CERTIFICATE OF CORRECTION

PATENT NO.     : 6,631,159 B1
DATED          : October 7, 2003
INVENTOR(S)    : Bernard Lee Morris It is certified that error appears in the above-identified patent and that said Letters Patent is hereby corrected as shown below:

<u>Column 8,</u>
Line 43, after the word "claim," insert -- 9 --

Signed and Sealed this

Twentieth Day of January, 2004

JON W. DUDAS
*Acting Director of the United States Patent and Trademark Office*